United States Patent
Velickovic et al.

(10) Patent No.: US 11,914,731 B1
(45) Date of Patent: Feb. 27, 2024

(54) CROSS-BOUNDARY DATA BACKUP BACKGROUND

(71) Applicant: Amazon Technologies, Inc., Seattle, WA (US)

(72) Inventors: Ivan Velickovic, Vancouver (CA); Alexander Sirotin, Coquitlam (CA); Christopher John Schilling, Seattle, WA (US); Steven Robert DeVos, Mercer Island, WA (US); Zhicong Wang, Seattle, WA (US); Wayne William Duso, Charlestown, MA (US); Boo Boon Khoo, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 17/037,189

(22) Filed: Sep. 29, 2020

(51) Int. Cl.
*G06F 21/62* (2013.01)
*G06F 11/14* (2006.01)
*H04L 9/40* (2022.01)

(52) U.S. Cl.
CPC ...... *G06F 21/6218* (2013.01); *G06F 11/1458* (2013.01); *H04L 63/105* (2013.01); *G06F 2201/84* (2013.01)

(58) Field of Classification Search
CPC ............. G06F 21/6218; G06F 11/1458; G06F 2201/84; H04L 63/105
See application file for complete search history.

(56) References Cited

U.S. PATENT DOCUMENTS

| | | | |
|---|---|---|---|
| 8,352,692 B1* | 1/2013 | Jordan | H04L 67/1046 711/216 |
| 9,430,491 B2* | 8/2016 | Vibhor | G06F 11/1451 |
| 9,772,909 B1* | 9/2017 | Xing | G06F 11/1458 |
| 10,067,839 B1* | 9/2018 | Bertz | G06F 11/1456 |
| 10,157,333 B1* | 12/2018 | Wang | G06N 3/045 |
| 10,922,132 B1* | 2/2021 | Shiramshetti | G06F 21/53 |
| 11,461,184 B2* | 10/2022 | Ramohalli Gopala Rao | H04L 69/04 |
| 2008/0199053 A1* | 8/2008 | Zafar | G06Q 40/00 705/35 |
| 2011/0029416 A1* | 2/2011 | Greenspan | G06Q 30/0611 705/26.4 |
| 2013/0275379 A1* | 10/2013 | Trebas | G06F 11/006 707/E17.005 |
| 2015/0296012 A1* | 10/2015 | Piyush | G06F 21/6245 709/217 |
| 2016/0085574 A1* | 3/2016 | Dornemann | G06F 3/067 718/1 |
| 2016/0085575 A1* | 3/2016 | Dornemann | G06F 11/2094 718/1 |
| 2016/0085636 A1* | 3/2016 | Dornemann | G06F 9/45558 707/679 |
| 2018/0260284 A1* | 9/2018 | Konetski | G06F 11/1448 |
| 2019/0087432 A1* | 3/2019 | Sion | G06F 21/6218 |
| 2019/0174302 A1* | 6/2019 | Zhou | H04L 63/105 |
| 2019/0251191 A1* | 8/2019 | Bedadala | G06V 40/168 |

(Continued)

*Primary Examiner* — Gary S Gracia

(74) *Attorney, Agent, or Firm* — Davis Wright Tremaine LLP

(57) ABSTRACT

Aspects described herein relate to securely performing cross-boundary backup operations. A service of a computing resource service provider may enable backup operations between a source account and a destination account of an organization based at least in part on a security policy allowing such operations.

20 Claims, 8 Drawing Sheets

(56) References Cited

U.S. PATENT DOCUMENTS

| | | | |
|---|---|---|---|
| 2020/0167091 A1* | 5/2020 | Haridas | G06F 3/067 |
| 2021/0109818 A1* | 4/2021 | Perneti | G06F 11/324 |
| 2022/0124078 A1* | 4/2022 | Erickson | H04L 9/0894 |
| 2022/0263657 A1* | 8/2022 | Chang | G06F 21/602 |

* cited by examiner

CROSS-BOUNDARY DATA BACKUP

BACKGROUND

BACKGROUND

The security of computing resources and associated data is of high importance in many contexts. As an example, networks of computing devices may be utilized to provide a robust set of services, including backup services, to organizations and their users. Within a network, a first user may be privileged with certain access rights and a second user may have a second set of access rights which may be different from the first user's access rights. Access rights of users in the context of a computing resource service provider may be defined using security policies, which may be utilized by the service provider as part of determining whether to grant or deny a user access to a computing resource. For example, whether to grant or deny backup operations.

Managing and maintaining the security of computer systems and computer networks is often complex and challenging. As the number and types of users and operations that are supported in a computer system or computer network expands, it may become difficult to determine whether the access rights associated with a user actually grant access to resources for which a user should have access and deny access to resources for which a user should not have access.

BRIEF DESCRIPTION OF THE DRAWINGS

Various techniques will be described with reference to the drawings, in which.

DETAILED DESCRIPTION

A computing resource service provider may provide clients access to services and resources. These services and resources may include, among other things, computing instances, databases, file systems, storage volumes, and data backup services. In addition, these clients may include a plurality of accounts consolidated into an organization which may include groups and subgroups. For example, an account management service can enable a client to organize a plurality of accounts under a single organization including a plurality of subgroups such as management, security, compliance, etc. The various accounts and subgroups, in some embodiments, provide logical boundaries to process access to data and resources. For example, data from a first account cannot be copied to a second account without the appropriate permissions. Furthermore, it may be advantageous to provide backup services to these clients to allow the backup and restore of organizational data. However, to prevent data exfiltration, the computing resource service provider, in various embodiments, provides security policies and enforcement to ensure that data is not exfiltrated (e.g., copied) to unauthorized locations.

In various embodiments, a backup service copies data (e.g., encrypted volume(s), database tables, file system, etc.) from a source account to a backup vault within a destination account. Furthermore, a security policy enforced by the backup service may be used to ensure that the source account, destination account, backup vault, and/or data to be copied have sufficient permissions to allow the backup operation to be performed. For example, a source account of an organization has access permissions to a particular computing resource (e.g., computing instance), a security policy enforced by the backup service may enable the source account to backup the particular computing resource to a backup vault associated with a destination account within the organization. This may provide the organization with protection from accidental or malicious deletion, exfiltration, or other interference with data from source accounts to destination accounts. In various embodiments described in the present disclosure, in the event that an account is compromised or particular backup data is compromised, the security policy may prevent unauthorized access and allow restoration of the account and/or backup data from authorized destination accounts.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
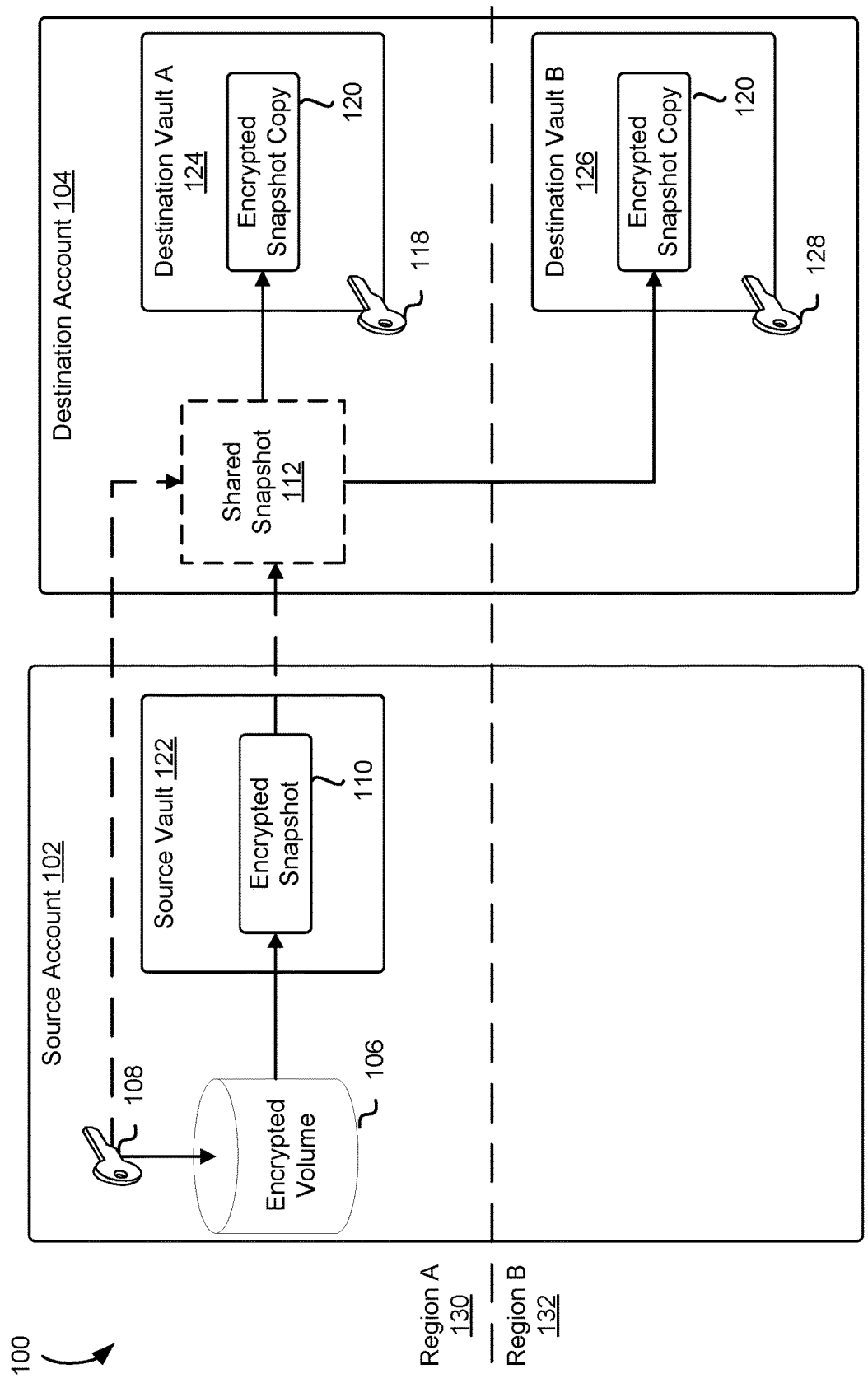
FIG. 1 illustrates an environment in which data is backed up across logical boundaries secured by a security policy in accordance with an embodiment.

FIG. 1 is an illustrative example of an environment 100 in which backup data is shared across a logical boundary in accordance with an embodiment. In an embodiment, the environment 100 includes a source account 102 including a source vault 122 and a destination account 104 including a destination vault A 124 in region A 130 and destination vault B 126 in region B 132. In various embodiments, the source account 102 includes any organization member account with data that can be backed up or otherwise copied to another account. As described above, an organization, in various embodiments, includes a plurality of distinct accounts with associated permissions to access computing resources and/or services of a computing resource service provider. Furthermore, in addition to the plurality of accounts, the organization may include a master account (e.g., an account with sufficient permissions to modify, create, and/or delete accounts and associated permissions), groups, and subgroups. In various embodiments, the organization is managed by an account management service. The account management service may include computing resources provided by the computing resource service provider that manage and track accounts of the organization and allows users to modify, create, and/or delete organizations and/or accounts. The logical boundaries described in the present disclosure may also be between organizations. For example, organizations can enable backup operations between organizations such that a first organization can copy backup data for storage within a second organization. In general, a logical boundary may exist between various entities, including both logical and physical entities such as organizations, enterprises, accounts, sub-accounts, groups, sub-groups, servers, data centers, geographical boundaries, and/or combinations thereof.

In various embodiments, the management account has sufficient permissions to enable and/or disable the copying of data (e.g., backup operations) between distinct accounts that are members of the organization. As described in greater detail below in connection with FIG. 5, various accounts (e.g., master account, source account, destination account, etc.) may be associated with different security policies defining various roles, permissions, actions, and/or computing resources of the account. In one example, the source account has sufficient permissions to copy backup data from a computing resource to the destination account, but the source account has insufficient privileges and/or permissions to delete backup data from the destination account. In general, the permissions associated with various accounts as defined by the security policy may follow the principle of least privilege and limit permissions (e.g., access rights, actions, copy, delete, edit, etc.) for an account to the minimum permissions to perform certain operations. For example, as described below in connection with FIGS. 2-4, an activity manager performing a backup operation obtains a role associated with a security policy that defines minimum permissions required to perform the backup operation.

Furthermore, as described in greater detail below in connection with FIG. 6, the management account may have additional controls such as enabling and/or disabling the copying of data between specific accounts, accounts within particular groups and/or subgroups, the type of data that can be copied, when data can be copied, accounts with access to copied data, or otherwise control access to backup data and/or backup operations. As illustrated in FIG. 1, the computing resources and account may be distributed across multiple regions (e.g., region A 130 and region B 132). In various embodiments, the regions include logical or physical boundaries for computing resources. In one example, the regions represent physical boundaries such as between two states or other such geographic boundaries. In other examples, the regions represent logical boundaries such as between data centers, particular computing resources, accounts, organizations, etc.

Returning to FIG. 1, in various embodiments, the source account 102 is within region A 130 and has a security policy associated with the source account 102. This security policy may provide access to computing resources such as an encrypted volume 106, an encrypted snapshot 110, and a source vault 122. The source account 102 may have access to other computing resources and/or services not shown in FIG. 1 for simplicity. In addition, while FIG. 1 shows the encrypted volume 106 and the encrypted snapshot 110, in various embodiments, this data is unencrypted. The encrypted snapshot 110 may be a point-in-time copy of the encrypted volume 106 used to create a backup of a workload, volume, file system, or other data stored in the encrypted volume 106. The encrypted snapshot 110, in various embodiments, is generated as part of a backup plan or other scheduled backup operation. In yet other embodiments, the encrypted snapshot 110 is generated on-demand or otherwise in response to a command issued from the source account 102 or other account with permission to the encrypted volume 106, such as a master account described above.

In various embodiments, the encrypted snapshot 110 is generated by an activity manager, described in greater detail below, which obtains credentials associated with source account 102 and performs the backup operations to generate the encrypted snapshot 110. The credentials may include a token, username and password, or other information indicating authorization to access particular resources. In some embodiments, the credentials are configured to provide the activity manager with sufficient permission to cause various Application Programming Interface (API) calls to be executed. For example, the activity manager utilizes the source account 102 credentials in an API call to a computing instance service that, as a result of being fulfilled, causes the computing instance service to generate the encrypted snapshot 110. The encrypted snapshot 110, in an embodiment, is stored within a source vault 122 within the source account 102. The source vault 122 may be a temporary storage area within the source account 102 accessible to the activity manager such that the encrypted snapshot 110 can be shared with the destination account 104. In various embodiments, described in the present disclosure, source vaults (e.g., the source vault 122) and backup vaults (e.g., the destination vault A 124) are containers used to marshal backup data and organize backups. These backup vaults may be encrypted with encryption keys associated with the corresponding account (e.g., a source account for a source vault or a destination account for destination vaults) and managed by a key management service. In one example, the source vault 122 is an identifier of the computing resource (e.g., snapshot, database, encrypted volume, etc.) that the backup service copies to one or more destination vaults such as destination vault A 124 and destination vault B 126 and generates a restore point for.

Similar to the source account 102, in various embodiments, the destination account 104 includes any account within the organization with credentials that grant sufficient permission to receive and store the encrypted snapshot 110. As described below, security policies associated with the accounts (e.g., source account 102 and destination account 104) may provide control and enforcement of permissions associated with copying of data between accounts within the organization. As illustrated in FIG. 1, the encrypted snapshot 110 is provided to the destination account 104 through a shared snapshot 112. The shared snapshot 112, in various embodiments, is the encrypted snapshot 110 and a corresponding encryption key 108 exposed to the destination account illustrated by the dashed lines in FIG. 1.

Once the encrypted snapshot 110 is shared or otherwise exposed to the destination account 104 (e.g., through the shared snapshot 112), the encrypted snapshot 110 can be copied to generate an encrypted snapshot copy 120 which is then stored in one or more destination vaults such as destination vault A 124 and destination vault B 126. The destination vault A 124 and the destination vault B 126 may include any storage location suitable for maintaining backup data. In addition, the encryption key 108 may be encrypted, for example, with encryption key 118 or encryption key 128. In yet other embodiments, the encrypted snapshot copy 120 is encrypted with the encryption key corresponding to the destination vault (e.g., encryption key 118 or encryption key 128).

Figure 2:
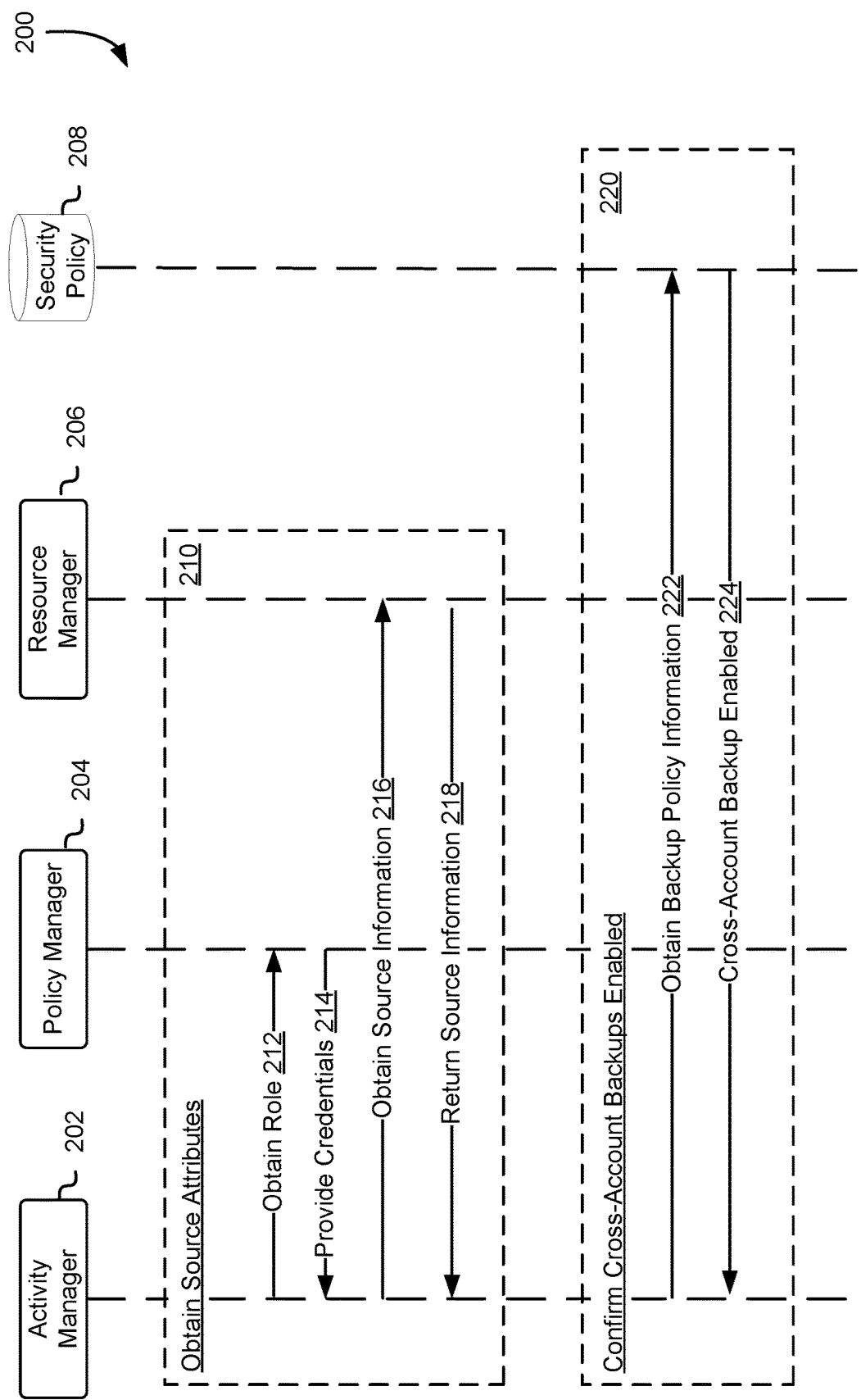
FIG. 2 illustrates a messaging diagram in which a security policy is enforced to secure backup data across a logical boundary in accordance with an embodiment.
Figure 3:
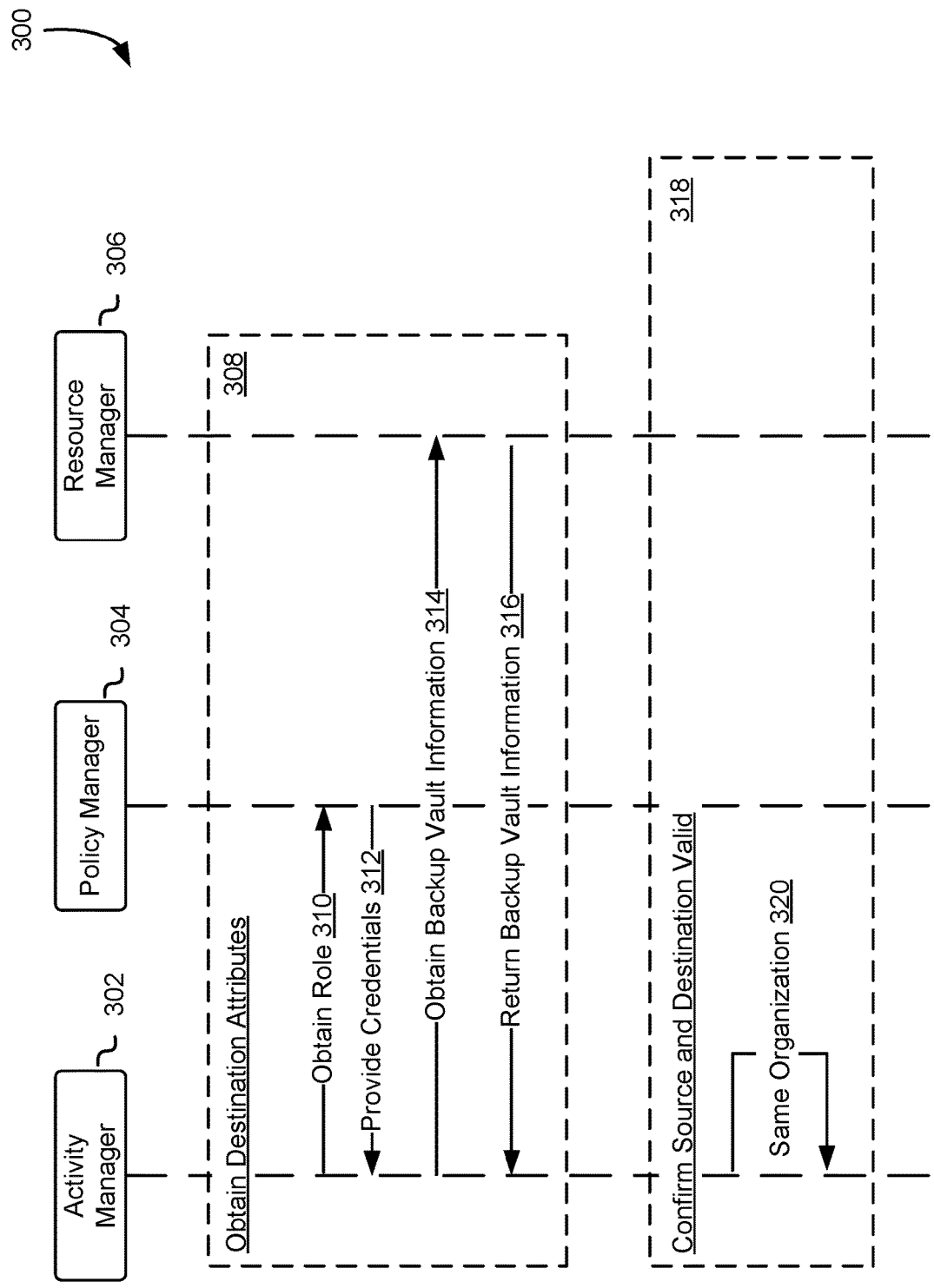
FIG. 3 illustrates a messaging diagram in which a security policy is enforced to secure backup data across a logical boundary in accordance with an embodiment.
Figure 4:
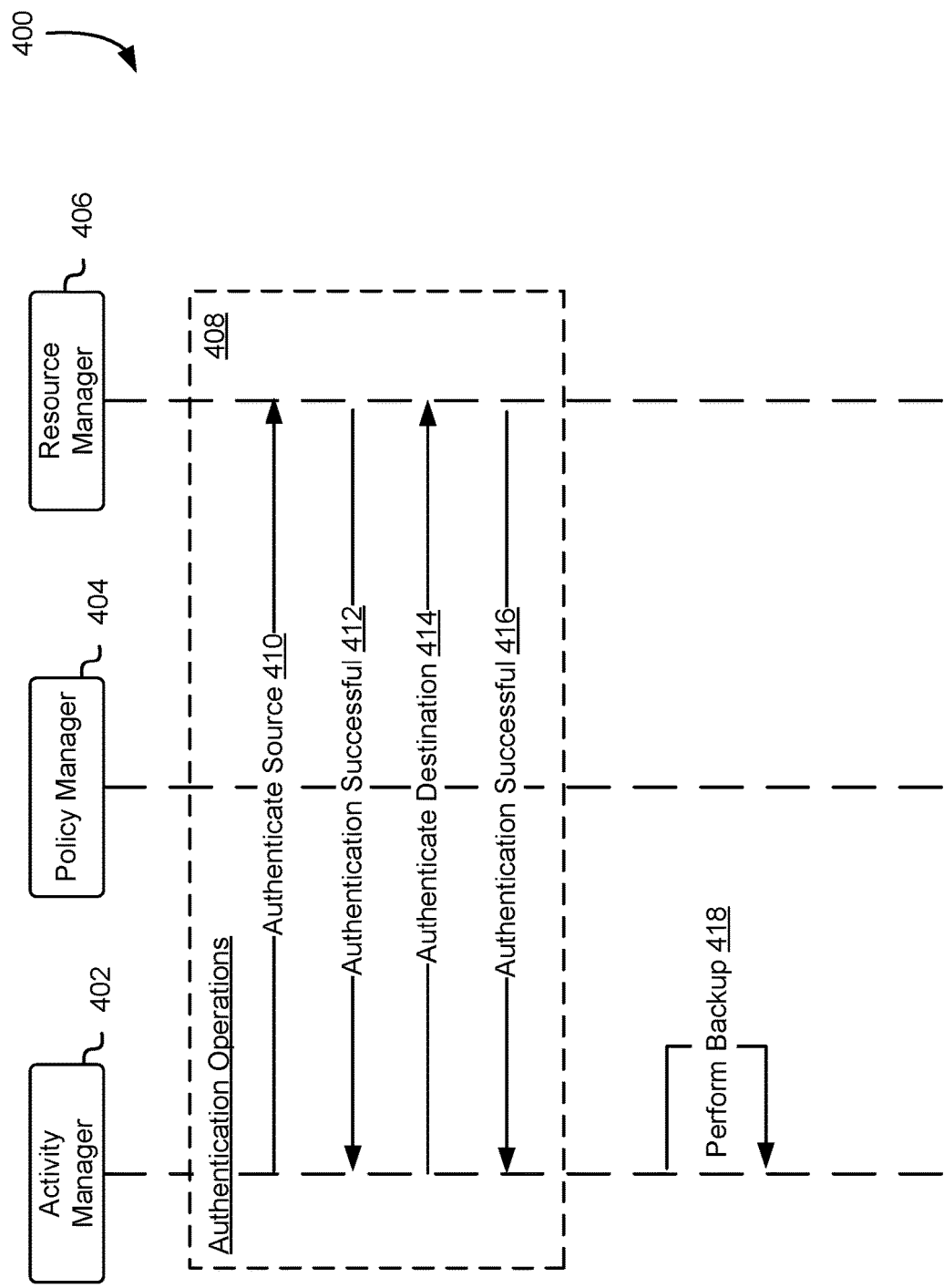
FIG. 4 illustrates a messaging diagram in which a security policy is enforced to secure backup data across a logical boundary in accordance with an embodiment.

Now referring to FIGS. 2, 3, and 4, the messaging diagrams 200, 300, and 400 described herein, comprise communications between computing resources to execute a computing process that may be performed using any combination of hardware, firmware, and/or software. For instance, various functions may be carried out by a processor executing instructions stored in memory. Each of the messaging diagrams may also be embodied as computer-usable instructions stored on computer storage media. The messaging diagrams may be provided by a standalone application, a service or hosted service (standalone or in combination with another hosted service), or a plug-in to another product, to name a few. In addition, messaging diagram 200 is described, by way of example, with respect to securing backup data across logical boundaries such as the environment 100 of FIG. 1. However, these messaging diagrams may additionally or alternatively be executed by any one system, or any combination of systems, including, but not limited to, those described herein. Furthermore, the operations described in these messaging diagrams may be performed in serial, parallel, or combination thereof.

FIG. 2 shows a messaging diagram 200 in which a security policy is enforced to secure backup data across a logical boundary in accordance with an embodiment. The messaging diagram 200 includes an activity manager 202, a policy manager 204, a resource manager 206, and a security policy 208. In various embodiments, the activity manager 202 is a component of a backup service or other service of a computing resource service provider which executes asynchronous long running operations like copy jobs, backup operations, and the like. In one instance, the activity manager 202 is a computer system configured with software and hardware, where execution of the software causes the computer system to perform backup operations and enforce security policies, including operations described herein as performed by the activity manager 202. The policy manager 204, in various embodiments, is a component of a security policy service or other service of the computing resource service provider which manages security policies including credentials which may be used to authenticate operations. For example, the policy manager 204 is a computer system configured with software and hardware, where execution of the software causes the computer system to manage security policies, including operations described herein as performed by the policy manager 204.

Furthermore, the security policy 208 may be generated and managed, at least in part, by the policy manager 204. For example, a master account associated with an Organization utilizes the policy manager 204 to create the security policy 208, which includes policy information associated with a set of accounts and/or computing resources of the organization.

The security policy 208, in an embodiment, includes one or more permission statements as well as additional information such as a role within an account and policy-wide information. The security policy 208 may further include a set of conditions that can be utilized to determine whether to grant access or deny access to computing resources in various contexts, such as in the context of different users and/or roles, different actions being performed on the computing resources, and different conditions of access. Authorization to perform various operations, such as those described elsewhere in this disclosure, in various embodiments, is evaluated based at least in part on a result (e.g., grant or deny) of evaluating a policy and/or credential associated with the policy in connection with the request (e.g., an API call). In some cases, policy-wide information is included in a policy header at the beginning of a policy or may even be stored separately from (and in association with) a policy document. The security policy 208 may include multiple policy statements, such as those described in the present disclosure.

In various embodiments, the resource manager 206 is a component of a backup service or other service of a computing resource service provider which manages access to various computing resources. In an embodiment, the resource manager 206 is a computer system configured with software and hardware, where execution of the software causes the computer system to maintain information associated with computing resources, including operations described herein as performed by the resource manager 206. For example, the resource manager 206 maintains attributes for computing resources associated with a particular account. In various embodiments, the resource manager 206 exposes a set of API calls that, once authenticated, enable access to various resources. In one example, as described in greater detail below, the resource manager 206 may provide the activity manager 202 with attributes of a source account and destination account to enable the activity manager 202 to perform a backup operation on data from the source account to the destination account.

Returning to FIG. 2, in an embodiment, the activity manager 202, in executing an asynchronous long running operation like a copy job, obtains source attributes 210. Obtaining source attributes 210 may include attributes of a source account and/or source vault as described above in connection to FIG. 1. In various embodiments, the attributes enable the activity manager 202 to access computing resources associated with the source account in order to back up data from the source account to the destination account. In an embodiment, to obtain the source attributes 210, the activity manager 202 obtains a role 212 from the policy manager 204. As described in greater detail below, the role may include a permission or set of permissions to allow a service or component thereof (e.g., the activity manager 202) to perform a specific task. The security policy may include a specific role that enables specified services to perform certain tasks that are required and the permissions may be limited to only those permissions required. For example, the security policy 208 includes a backup operator role that includes only the permissions required to copy a first computing resource (e.g., an encrypted volume associated with a source account) and write the copy to a second computing resource (e.g., a destination vault associated with a destination account). The activity manager 202, in various embodiments, transmits an API call to the policy manager 204 to obtain the role 212 to obtain credential information (e.g., an encrypted token indicating successful performance of operations involved in assuming the role, such as authentication and authorization) that enables the activity manager 202 to exercise a set of permissions corresponding to the role.

In various embodiments, in response to the API call from the activity manager 202, the policy manager 204 provides the credentials associated 214 with the role. The credentials may include a token, a pointer to the security policy, a set of permissions, or other information that, as a result of being authenticated, provide access to computing resources. The activity manager 202, once the credentials have been obtained, may obtain source information 216 from the resource manager 206. The source information 216 may include various attributes associated with a source account or other computing resource associated with the account such as policy information, credentials, path of a computing resource (e.g., data to be copied to the destination account), other location information, and/or other information suitable for use in backup and restore operations. In various embodiments, the activity manager 202 transmits an API call including the credentials to the resource manager 206. The resource manager 206 may determine whether the activity manager 202 is authorized to obtain the source information based at least in part on the credentials. If the activity manager 202 is authorized, the resource manager 206 may return the source information 218. In an embodiment, resource manager 206 returns metadata about the backup vault or other location indicated by the specified name included in the request. For example, the metadata includes a computing resource provider name that uniquely identifies the computing resources within the computing resource provider environment, an identifier of a logical container where backups are stored, a creation date, an encryption key associated with the backup vault, an identifier of an account or entity responsible for creating the backup vault, and other information suitable for identifying a particular source vault or backup vault. However, if the activity manager 202 is not authorized (e.g., the credentials are invalid), in an embodiment, the resource manager 206 denies the request for source information. Furthermore, the source information may include information identifying an organization of which the source account is a member, attributes of the source account, path or other location information for computing resources associated with the source account to be copied, a policy associated with the source account and/or computing resources, and any other information suitable for allowing the activity manager 202 to perform backup operations on computing resources associated with the source account. As described in the present disclosure, attributes of an account (e.g., source account or destination account) include metadata associated with the account, credentials, path, location information, organization information, group information, entity information, policy, permissions, or other information suitable for use by the backup service or component thereof to perform backup and/or restore operations.

In various embodiments, as part of the backup operation, the activity manager 202 confirms that cross-account backups are enabled 220 for the organization. Although FIG. 2 illustrates cross-account backups, the operation described in connection with FIGS. 2, 3, and 4 may be used to perform backup operations across various other logical boundaries as described above. The activity manager 202 may obtain backup policy information 222 from the security policy 208. As described above, the security policy 208 may include permissions associated with operations that may be performed within the organization. For example, an administrator, through a management account, enables cross-account backups for the organization by at least modifying the security policy 208 to allow cross-account backups. Returning to FIG. 2, the activity manager 202 obtains policy information from the security policy 208 indicating that cross-account backups are enabled 224 for the organization. In yet other embodiments, cross-account backups are disabled from the organization and the activity manager 202 terminates the backup operation.

FIG. 3 shows a messaging diagram 300 in which a security policy is enforced to secure backup data across a logical boundary in accordance with an embodiment. The messaging diagram 300 includes an activity manager 302, a policy manager 304, and a resource manager 306 which, in various embodiments, may be the same as those described above in connection with FIG. 2. As illustrated in the messaging diagram 300, the activity manager 302, in executing an asynchronous long running operation like a copy job, obtains destination attributes 308. Obtaining destination attributes 308 may include attributes of a destination account and/or destination vault as described above in connection to FIG. 1. In various embodiments, the attributes enable the activity manager 302 to access computing resources associated with the destination account in order to store data from the source account to a destination vault associated with the destination account. In an embodiment, to obtain the destination attributes 308, the activity manager 302 obtains a role 310 from the policy manager 304. The role may include a backup operator role as described above in connection with FIG. 2. The activity manager 302, in various embodiments, transmits an API call to the policy manager 304 to obtain the role 310.

In various embodiments, in response to the API call from the activity manager 302, the policy manager 304 provides the credentials 312 associated with the role. The credentials may include a token, a pointer to the security policy, a set of permissions, or other information that, as a result of being authenticated, provide access to computing resources (e.g., the destination vault). The activity manager 302, once the credentials have been obtained, may obtain backup vault information 314 from the resource manager 306. In various embodiments, the activity manager 302 transmits an API call including the credentials to the resource manager 306. The destination vault information may include a set of attributes associated with the destination account and/or destination vault such as policy information, credentials, path associated with the destination vault, or other information suitable for performing backup and/or restore operations. The resource manager 306 may determine whether the activity manager 302 is authorized to obtain the destination vault information based at least in part on the credentials. If the activity manager 302 is authorized, the resource manager 306 may return the backup vault information 316. However, if the activity manager 302 is not authorized (e.g., the credentials are invalid), in an embodiment, the resource manager 306 denies the request for the destination vault information. In one example, the destination vault information may include information identifying an organization of which the destination account associated with the destination vault is a member, attributes of the destination vault, path or other location information for computing resources associated with the destination vault, a policy associated with the destination account and/or destination vault, and any other information suitable for allowing the activity manager 302 to perform backup operations on computing resources associated with the destination vault.

The activity manager 302 may then confirm that the source and destination are valid 318. In various embodiments, the security policy for the organization includes conditions and/or requirements for copying data across logical boundaries. For example, as illustrated in the messaging diagram 300, the security policy requires that the source account and the destination account be members of the same organization 320. The activity manager 302, in an embodiment, compares the source information and destination information (e.g., destination vault information) obtained from the resource manager 306 to determine whether the source account and the destination account are members of the same organization. Although, the messaging diagram 300 shows that the source account and destination account are members of the same organization, other conditions may be used in addition to or as an alternative to being members of the same organization.

FIG. 4 shows a messaging diagram 400 in which a security policy is enforced to secure backup data across a logical boundary in accordance with an embodiment. The messaging diagram 400 includes an activity manager 402, a policy manager 404, and a resource manager 406 which, in various embodiments, may be the same as those described above in connection with FIG. 2. As illustrated in the messaging diagram 400, the activity manager 402, in executing an asynchronous long running operation like a copy job, performs authentication operations 408 to authenticate the source of the data to be copied and the destination of the data to be backed up. In order to perform the authentication operations 408, in an embodiment, the activity manager 402 transmits a request to the resource manager 406 to authenticate the source 410. For example, the activity manager 402 transmits an API call including source account credentials, a security policy associated with the source account, and a location of the destination vault.

In various embodiments, if the source account information is authenticated, the resource manager 406 indicates success 412 to the activity manager 402. In yet other embodiments, if the source account information is unable to be authenticated, the resource manager 406 indicates the failure to the activity manager 402. The activity manager 402 may also transmit a request to the resource manager 406 to authenticate the destination 414. In one example, the activity manager 402 transmits an API call to the resource manager 406 including the source account credentials and a security policy associated with the destination vault. In various embodiments, if the destination account information is authenticated, the resource manager 406 indicates success 416 to the activity manager 402. In yet other embodiments, if the destination account information is unable to be authenticated, the resource manager 406 indicates the failure to the activity manager 402. In some embodiments, authentication of the source 410 and the destination 414 are performed in parallel. Furthermore, successful authentication of the source 410 and the destination 414 may indicate to the activity manager 402 that the backup operations can be performed. For example, successful authentication of the source 410 and the destination 414 indicates that the credentials enable access to the computing resource to be copied and the destination vault to store the copy and that the location of the computing resource and destination vault are valid and accessible. Once the activity manager 402 has completed the authentication operations 408 successfully, in an embodiment, the activity manager 402 performs the backup operation 418 or other asynchronous long running operations.

Figure 5:
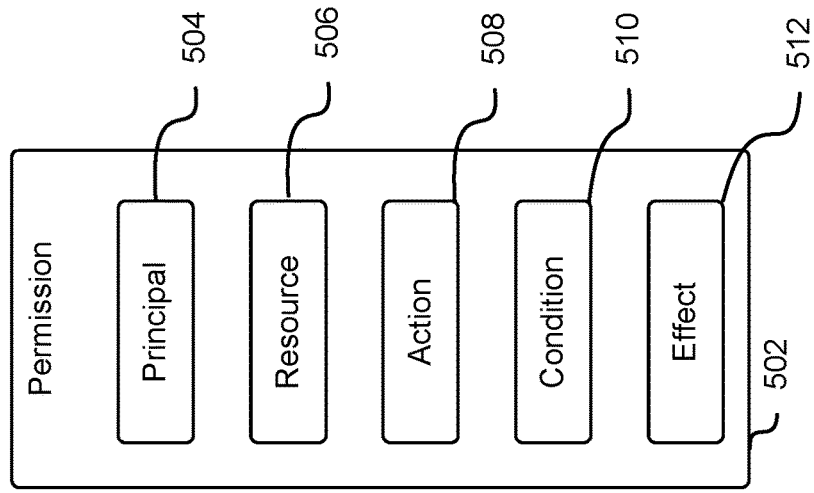
FIG. 5 illustrates an environment in which a security policy is used to define permissions across logical boundaries in accordance with an embodiment.

FIG. 5 shows an environment 500 in which a permission 502 and a corresponding security policy statement 514 are shown. The permission 502 illustrated in FIG. 5 may be one of a plurality of security permissions specified in a security policy, such as security policies described in the present disclosure, for example, in connection with FIG. 1.

The environment 500 illustrates an example permission 502 which may be associated with a security policy. In addition, the security policy statement 514 may be a portion of the security policy or may be the entire security policy. In some embodiments, the permission 502 may specify a principal 504, a resource 506, an action 508, a condition 510, and an effect 512. In some embodiments, the permission 502 may also specify a plurality of one or more of these elements such as, for example, a set or class of accounts, roles, a collection of resources, several different actions, and/or multiple conditions. In some embodiments, the permission 502 may specify one or more wildcards or otherwise modifiable characters that may be used to denote that the permission 502 may be modified to make the permission 502 applicable to different accounts and their associated resources. For example, a source account has sufficient permissions 502 to generate backup data and copy backup data to a destination account but has insufficient permissions 502 to delete the backup data (either associated with the source account or the destination account).

Wildcards may be represented in various formats—for example, an asterisk may represent any number of characters and a question mark may represent any single character. In some embodiments, the security policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

The principal 504 may be an account, a group, an organization, a role, a service or component thereof, or a collection and/or combination of these or other such entities. A principal 504 may be any entity that is capable of submitting API calls that cause an action associated with a resource to be performed and/or any entity to which permissions associated with a resource may be granted. As an example, the permission 502 may have the principal 504 element specified in the following manner as illustrated in the security policy statement:

"Principal": "rn:ws:iam::root"

In some embodiments, the principal 504 is identified by a resource name that uniquely identifies the principal 504. A principal 504 may include one or more name spaces that include additional information regarding the principal. For example, "rn" may refer to a resource name prefix and identifies the subsequent information as part of a resource name; "ws" may refer to a partition namespace that the resource is in; "iam" may refer to a service namespace that identifies a service of a computing resource service provider (e.g., the computing resource service provider may provide services related to identity and access management); namespaces may additionally be omitted (note that there are two semicolons in the example above between "iam" and "root")—in some formats and/or for some resources, a region namespace may be an option; and "root" may refer to an identifier for the account, such as the account that owns the resource 506 specified in the permission 502.

The resource 506 may refer to a computing resource of a computing resource service provider. Computing resources of a computing resource service provider may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources 506 may be organized in a hierarchy, and may use structures such as folders, directories, buckets, etc., to organize sets of computing resources into groupings. In an embodiment, policies and/or permissions are applied directly to a destination vault and grant cross-account backups to an organization. As an example, the permission 502 may have the resource 506 element specified in the following manner:

"Resource": "DestinationVault"

In some embodiments, the resource 506 is identified by a resource name that uniquely identifies the resource 506. In various embodiments, the resource 506 shares a naming convention as the principal 504 or other elements of the permission 502. However, this need not be the case, as each separate element of the permission 502 may use a distinct naming convention, namespace, format, etc. that is independent of other elements. In the example resource given above, "DestinationVault" refers to a computing resource which may be used to store backup data.

The action 508, in various embodiments, is a specific action or actions that will be allowed or denied by the permission. Different types of services (e.g., having different service namespaces) may support different actions. For example, an activity manager of a backup service supports backup operations from a source account to the "DestinationVault" computing resources indicated in the security policy statement 514. An action 508 may be performed in association with the resource and may, for example, be identified by a type of API call, a library call, a program, process, a series of steps, a workflow, or some other such action. As an example, the permission 502 may have the action 508 element specified in the following manner:

"Action": "backup:CopyIntoBackupVault"

In this example, the action 508 that is allowed or denied (determined based on the effect 512 specified in the permission) corresponds to the backup service that supports an action (e.g., API call) for "CopyIntoBackupVault," which may be used in connection with obtaining an object and/or access to an object of a storage service. As discussed elsewhere, various namespaces may be used in connection with specifying an action. Wildcards may be used to specify multiple actions. For example, an action element described as "Action": "backup:*" may refer to all APIs supported by the backup service.

The condition 510 element may be one or more conditions that specify when a security policy is in effect. In some embodiments, the condition element is optional and may be omitted in some permissions. Conditions may be described as Boolean expressions that may be used to determine whether the policy is in effect (i.e., if the expression evaluates to TRUE) or not in effect (i.e., if the expression evaluates to FALSE). Security policies that are not in effect may be unenforced or ignored. In some embodiments, conditions in the permission 502 are evaluated against values provided as part of a web API request corresponding to one or more APIs specified in the action 508 element. Various other types of condition operators may exist, which may be used for comparing string conditions, numeric conditions, Boolean conditions, binary conditions (e.g., testing values in binary format), IP address conditions (e.g., testing values against a specific IP address or range of IP addresses), and more.

In various embodiments, the effect 512 refers to whether the permission 502 is used to grant or deny access to the computing resources specified in the permission 502 in the resource 506 element. The effect 512 may be an "Allow" effect, which grants access to a resource, or a "Deny" effect, which denies access to a resource. In some embodiments, access to computing resources of a computing resource service provider are denied by default and a permission affirmatively including an "Allow" effect is required. As an example, the permission 502 includes the effect 512 element specified in the following manner:

"Effect": "Allow"

Accordingly, a permission statement that grants a particular principal (e.g., "rn:ws:iam::root") access to call a storage service API (e.g., "backup: CopyIntoBackupVault") and copies data into the resource "DestinationVault." It should be noted that the examples described above merely describe one of many ways in which permissions may be expressed. Of course, in other embodiments, variations on the principles described above in connection with FIG. 5 may be applied in various ways.

In some embodiments, elements may be described in inverse (e.g., negative) terms. An inverse element may be applied to all matches except for those specified in the element. For example, if a permission statement is described as "NotPrincipal: root" then the permission statement applies to all principals except the particular principal or principals listed in the permission statement—in this case, the permission statement would apply to all principals except root. An inverse element may be used in conjunction with the principal element (e.g., a "NotPrincipal" element would apply to all principals except those listed), the action element (e.g., a "NotAction" element would apply to all actions except those listed), the resource element (e.g., a "NotResource" element would apply to all resources except those listed), and so on.

Figure 6:
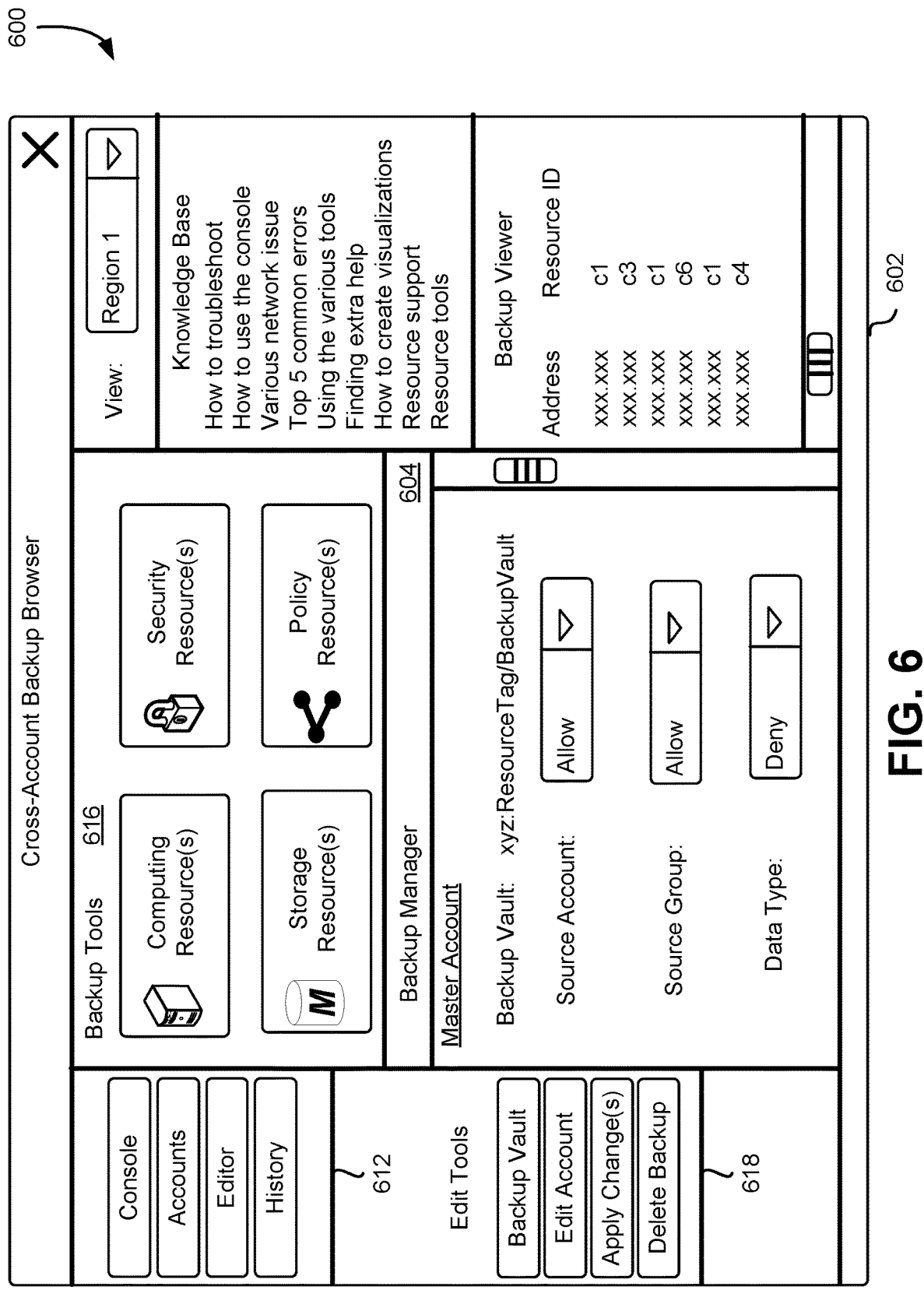
FIG. 6 illustrates a graphical user interface for defining security policies for backing up data across logical boundaries in accordance with an embodiment.

FIG. 6 illustrates an example system 600 where a cross-account backup browser 602 is used to provide information associated with a backup service that allows backup data to be stored across logical boundaries such as accounts within an organization as described in the present disclosure, for example, as in connection with FIGS. 1-5 and in accordance with at least one embodiment. As described above, in various embodiments, the cross-account backup browser 602 is executed by a computer system and is provided as a user interface to a set of services such as the backup service, security policy service, virtual computer systems service, or other services as described in the present disclosure.

As illustrated in FIG. 6, the cross-account backup browser 602 is provided as a user interface executed by an application, such as a web browser executing on a computer system operated by the user, as well as other user interfaces that may be used to present backup information as described above. Furthermore, as illustrated in FIG. 6, the user is presented with backup information generated by a backup service in a display pane labeled as the "Backup Manager 604."

The backup manager 604 may include backup information, security policy information, and/or any other information associated with backup operations as described above. In the specific example illustrated in FIG. 6, the backup manager 604 includes a set of permissions associated with a specific backup vault. The permissions, as illustrated in FIG. 6, allow or deny specific actions associated with principals on the backup vault computing resource. For example, a master account associated with the organization may allow or deny particular accounts, groups, subgroups, and/or data types to perform actions (e.g., backup data in the destination vault). Furthermore, in some embodiments, the backup manager 604 guides the user through the process of setting up backup operations, creating backup resources, and generating a backup plan to schedule future backups.

The cross-account backup browser 602 includes backup tools 616 that aid the customer in performing various operations as described in greater detail above. In an example, the backup tools 616 aid the user in enabling data backups across logical boundaries while maintaining security using security policies and other enforcement mechanisms. As illustrated in FIG. 6, the cross-account backup browser 602 further includes a set of options 612 used to perform various functions in connection with the cross-account backup browser 602. The set of options 612 may be a set of functions included in the cross-account backup browser 602 that enable the user to perform a variety of operations as described in greater detail above in connection with FIGS. 1-5. The options 612 may be configured as graphical user interface elements of the cross-account backup browser 602.

The customer may use editing tools 618 to edit, create, or modify existing computing resources as described above. An operation enabled by the cross-account backup browser 602 includes a view of different regions from a drop-down menu. The different regions may include different geographical regions or different logical regions within the same or different geographical regions. For example, different regions may include two or more separate virtual networks. Customers may navigate to a particular group using a graphical user interface element as illustrated in FIG. 6. Selection of a particular region may limit the information and generate views of information specific to the region.

In various embodiments, the editing tools 618 provide, through the cross-account backup browser 602, the user with resources to aid in generating backup vaults, accounts, modifying permissions, or generally controlling backup operations. In the example, the editing tools 618 allow customers to create, delete, and modify backup vaults. The cross-account backup browser 602 may further include a backup viewer. The backup viewer, in various embodiments, provides the user with information regarding restore points. In one example, the backup viewer includes a set of snapshots that have been created and are associated with one or more logical storage volumes.

Figure 7:
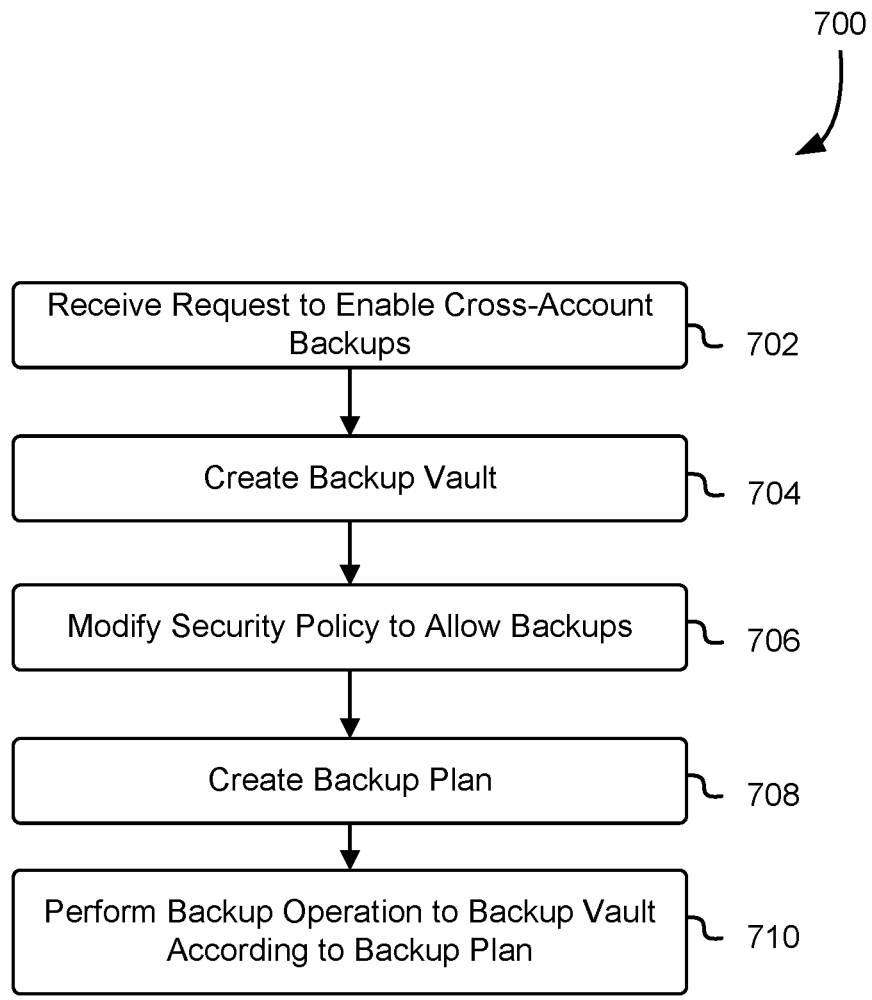
FIG. 7 illustrates a process for securely backing up data across a logical boundary based at least in part on a security policy in accordance with an embodiment.

FIG. 7 is an illustrative example of a process 700 for enabling backup operations across logical boundaries such as distinct accounts in accordance with various embodiments described in the present disclosure. The process 700 may be performed by a backup service and/or other components (e.g., activity manager or resource manager) of a computing resource service provider or combination thereof, as described above. In step 702, the system executing the process 700 receives a request to enable cross-account backups. In one example, the backup service obtains an API call indicating an organization or set of accounts to enable cross-account backups for. In other examples, enabling cross-accounts backups include modifying a security policy to allow the cross-account backup operations.

In various embodiments, once cross-account backup operations are enabled, the system executing the process 700 creates a backup vault 704. In an example, the system executing the process 700 prompts a user to create a backup vault. In yet other embodiments, the backup vault may already exist and the system executing the process 700 may simple update the security policy and/or resource information to indicate the backup vault is capable of storing data, snapshots, or other backup information from other accounts. In step 706, the system executing the process 700 modifies the security policy to allow backups. As described above in connection with FIG. 5, the security policy may include various conditions, effects, permissions, and actions that are assignable to the backup vault (e.g., the resources) for particular principals (e.g., accounts, organizations, groups, subgroups, entities, or other actors). For example, the system executing the process 700 modifies the security policy associated with the backup vault to indicate the backup action is allowed and an account or set of accounts that have permissions to perform the backup action.

In step 708, the system executing the process 700 creates a backup plan. As described above, the backup plan includes a schedule of data from a source account to be backed up in a particular destination account, backup vault, and/or region. In various embodiments, the system executing the process 700 guides a user through a process of creating a backup plan or otherwise prompts the user to create a backup plan. In step 710, the system executing the process 700 performs backup operations to the backup vault according to the backup plan. As described above in connection with FIGS. 2-4, performing the backup operations may include a set of operations to determine if the backup operations are allowed across a logical boundary such as the source account and the destination account. Variations of the process 700 may be used in accordance with the present disclosure. For example, steps may be omitted, modified, performed in various orders, performed in parallel, or additional steps may be performed. For example, the system executing the process 700 may perform backup operations on-demand or otherwise in response to user commands and; therefore, may omit step 708.

As one skilled in the art will appreciate in light of this disclosure, certain embodiments may be capable of achieving certain advantages, including some or all of the following: increases security of backup data; prevents unauthorized or accidental exfiltration or deletion of backup data; automates backup operations while maintaining security; provides security checks to ensure that data is secure from unauthorized access.

Figure 8:
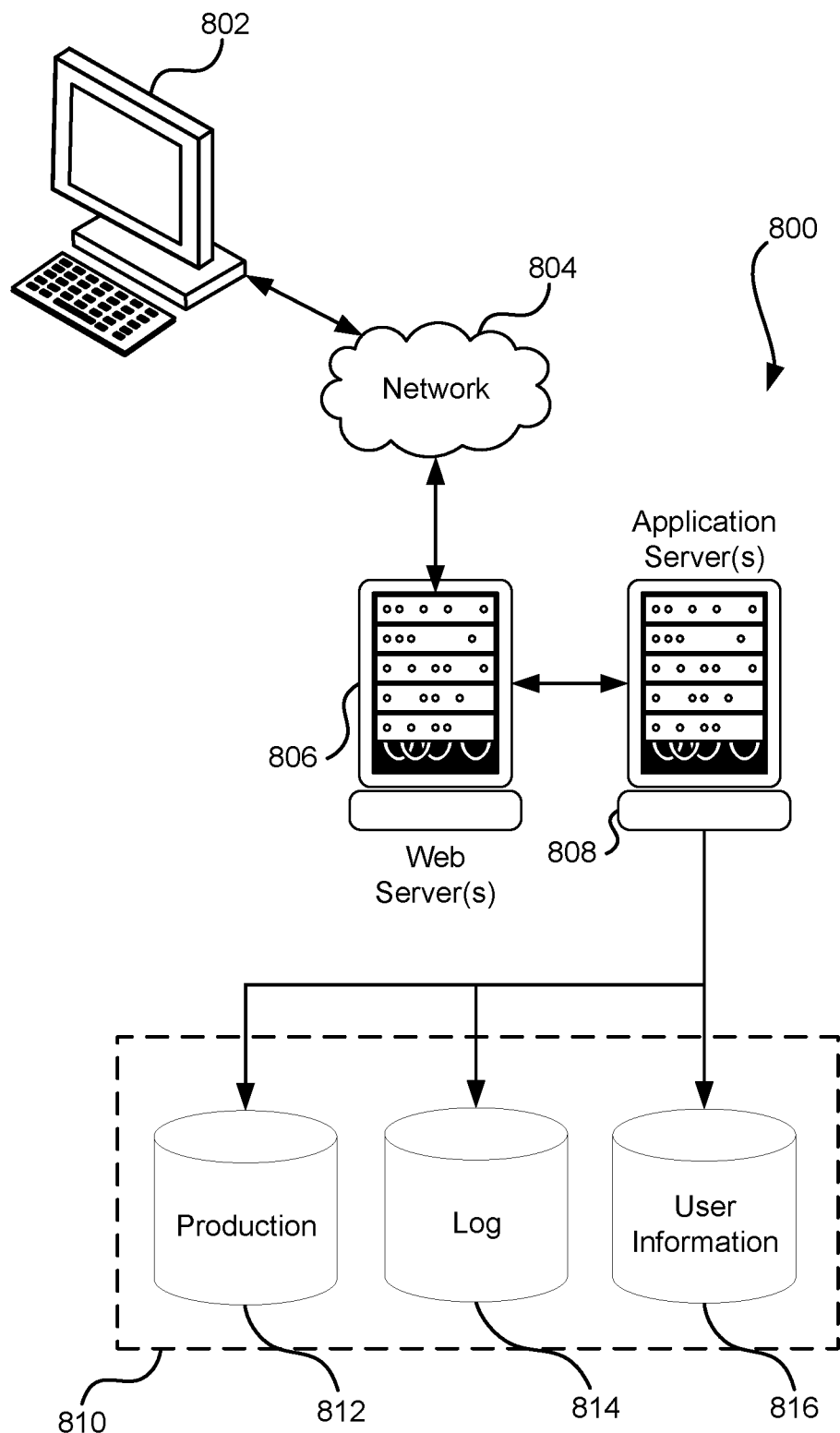
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. For example, the application server 808 may execute various components of the backup service or other service as described above such as the activity manager, policy manager, or resource manager. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining source account attributes for a backup operation from a source account to a destination account, wherein the backup operation causes data to be copied from the source account to the destination account based at least in part on the source account attributes, wherein the source account is associated with a first member of an organization and the destination account is associated with a second member of the organization;
   generating a first determination that cross-account backup operations from the source account to the destination account are allowed based at least in part on a first security policy associated with the organization;
   obtaining information from a second security policy associated with a portion of the destination account, the information identifying a logical storage location associated with the destination account for maintaining the data;
   generating a second determination that the source account and the destination account are members of the organization;
   authenticating the source account and the destination account to determine that the backup operation can be performed from the source account to the destination account; and
   performing the backup operation as a result of the first determination indicating that permissions associated with the source account are insufficient to delete the data and the second determination indicating that the permissions associated with the destination account are sufficient to receive the data from the source account, wherein the backup operation includes storing a copy of an encrypted version of the data in the logical storage location as a result of exposing, to the destination account, the encrypted version and a corresponding key.

2. The computer-implemented method of claim 1, wherein the computer-implemented method further comprises:
   generating a third determination that the source account and the destination account are both members of a group within the organization; and
   wherein performing the backup operation further comprises performing the backup operation based at least in part on the third determination.

3. The computer-implemented method of claim 1, wherein the logical storage location comprises a backup vault associated with a second security policy that indicates a type of data that can be copied to the backup vault during the backup operation.

4. The computer-implemented method of claim 1, wherein the computer-implemented method further comprises:
   generating a third determination that the destination account is a member of a first group within the organization and the source account is a member of a second group within the organization and the first group and the second group are distinct; and
   wherein performing the backup operation further comprises performing the backup operation based at least in part on the third determination.

5. A system, comprising:
   one or more processors; and
   memory that stores computer-executable instructions that, as a result of being executed by the one or more processors, cause the system to:
      configure a first security policy to allow cross-account backup operations for a set of accounts associated with an organization;
      configure a second security policy associated with a first portion of a source account of the set of accounts to allow data to be copied from a computing resource of the source account to a set of destination accounts, wherein the source account and the destination account are associated with different members of the organization;
      configure a third security policy associated with a second portion of a destination account of the set of destination accounts to allow the second portion of the destination account to receive the data copied from a subset of accounts of the set of accounts, where the source account is a member of the subset of accounts; and
      allow a backup operation to be performed, where the backup operation copies an encrypted version of the data from the source account to the second portion of the destination account as a result of the first security policy, the second security policy, the third security policy indicating sufficient permissions to perform the backup operation, and the source account sharing the encrypted version and corresponding key.

6. The system of claim 5, wherein the source account and the destination account are separated by a logical boundary that prevents the data from being copied across the logical boundary.

7. The system of claim 5, wherein the third security policy indicates a set of attributes, a first attribute of the set of attributes including a path to a backup vault associated with the second portion of the destination account, where the backup vault is a storage location associated with the destination account.

8. The system of claim 5, wherein the second security policy includes a role that provides a component of a backup service performing the backup operations to obtain a credential with sufficient permissions to access the computing resource.

9. The system of claim 8, wherein the role is limited to a principal indicated in the second security policy.

10. The system of claim 9, wherein the instructions that cause the system to perform the backup operation further include instructions that as a result of being executed by the one or more processors, cause the system to determine that the source account and the destination account are members of the organization prior to performing the backup operation.

11. The system of claim 10, wherein the source account and the destination account are assigned to a particular group within the organization.

12. The system of claim 11, wherein the instructions further include instructions that as a result of being executed by the one or more processors, cause the system to transmit a request to a second component of the backup service to determine the second security policy associated with the source account allows the data to be copied to the destination account and the third security policy allows the data from the source account to be copied to the destination account.

13. A non-transitory computer-readable storage medium storing thereon executable instructions that, as a result of being executed by one or more processors of a computer system, cause the computer system to:
 detect a trigger to perform a cross-account backup operation from a source account to a destination account, wherein the source account and the destination account are associated with different members of an organization;
 verify that a security policy associated with the organization permits backup operations to transmit data across a logical boundary between the source account and the destination account, that the security policy includes sufficient permissions in the source account to permit the backup operation to copy the data from the source account to the destination account, and that the security policy includes sufficient permissions in the destination account to obtain the data from the source account during the backup operation; and
 perform the backup operation from the source account to the destination account by storing a copy of encrypted data to a vault associated with the destination account as a result of the source account exposing the encrypted data and corresponding key to the destination account.

14. The non-transitory computer-readable storage medium of claim 13, wherein the instructions further comprise instructions that, as a result of being executed by the one or more processors, cause the computer system to determine that the source account and the destination account are associated with the organization.

15. The non-transitory computer-readable storage medium of claim 13, wherein the instructions that cause the computer system to perform the backup operation further include instructions that cause the computer system to assume a role indicated in the security policy, where the role includes permissions to copy resources from the source account.

16. The non-transitory computer-readable storage medium of claim 13, wherein the instructions that cause the computer system to perform the backup operation further include instructions that cause the computer system to obtain a first set of attributes indicating the organization associated with the source account, a path associated with the data of the source account to be copied, and a second security policy associated with the data of the source account.

17. The non-transitory computer-readable storage medium of claim 16, wherein the instructions that cause the computer system to perform the backup operation further include instructions that cause the computer system to obtain a copy of the encrypted data based at least in part on the path.

18. The non-transitory computer-readable storage medium of claim 16, wherein the instructions that cause the computer system to perform the backup operation further include instructions that cause the computer system to provide a copy of the data to the vault associated with the destination account based at least in part on a second path of the vault.

19. The non-transitory computer-readable storage medium of claim 13, wherein the instructions that cause the computer system to detect the trigger further include instructions that cause the computer system to detect the trigger according to a backup plan.

20. The non-transitory computer-readable storage medium of claim 13, wherein the instructions further comprise instructions that, as a result of being executed by the one or more processors, cause the computer system to modify the security policy to allow the data to be transmitted across a logical boundary between the source account and the destination account.

* * * * *